(12) United States Patent
Doi

(10) Patent No.: US 6,480,760 B1
(45) Date of Patent: Nov. 12, 2002

(54) ROBOT RESTARTING METHOD

(75) Inventor: Koji Doi, Kakogawa (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 09/795,434

(22) Filed: Mar. 1, 2001

(30) Foreign Application Priority Data

Mar. 15, 2000 (JP) ........................................ 2000-072024

(51) Int. Cl.$^7$ ............................................... G06F 19/00
(52) U.S. Cl. ..................... 700/245; 700/189; 700/252; 700/254; 700/257; 700/245; 318/560; 318/567; 318/568.15; 318/568.16; 318/568.24; 901/2; 901/9; 701/23; 706/52; 219/124.34
(58) Field of Search ................................. 700/189, 245, 700/254, 257, 262, 252; 318/567, 560, 568.15, 568.16, 568.24; 901/2, 9; 219/124.34; 706/52, 47; 701/23; 90/23, 20, 43, 46, 7

(56) References Cited

U.S. PATENT DOCUMENTS

| | | | | |
|---|---|---|---|---|
| 4,170,751 A | * | 10/1979 | Stricker | 118/679 |
| 4,249,243 A | * | 2/1981 | Yoshida et al. | 318/569 |
| 5,119,318 A | * | 6/1992 | Paradies et al. | 706/47 |
| 5,136,223 A | * | 8/1992 | Karakama et al. | 318/567 |
| 5,239,457 A | * | 8/1993 | Steidle et al. | 156/361 |
| 5,834,916 A | * | 11/1998 | Shimogama et al. | 318/568.11 |
| 5,901,650 A | * | 5/1999 | Turner et al. | 104/88.01 |
| 5,912,540 A | * | 6/1999 | Kosaka et al. | 318/568.14 |
| 6,097,169 A | * | 8/2000 | Watanabe et al. | 112/453 |
| 6,163,124 A | * | 12/2000 | Ito et al. | 318/560 |
| 6,208,105 B1 | * | 3/2001 | Kato et al. | 318/567 |
| 2001/0047225 A1 | * | 11/2001 | Shimoike et al. | 700/250 |

FOREIGN PATENT DOCUMENTS

| | | | |
|---|---|---|---|
| JP | 3-104581 | | 5/1991 |
| JP | A 5-100732 | | 4/1993 |
| JP | 8-305429 A | * | 11/1996 |
| JP | 08305429 | * | 11/1996 |
| JP | 409091018 A | * | 3/1997 |
| JP | 10-214108 | | 8/1998 |
| JP | 11-175130 | | 7/1999 |

* cited by examiner

*Primary Examiner*—William A. Cuchlinski, Jr.
*Assistant Examiner*—McDieunel Marc
(74) *Attorney, Agent, or Firm*—Oliff & Berridge, PLC

(57) ABSTRACT

When an emergency stop button 12 is pressed after a robot 1 passes a teaching point $P_N$, and then reach a position $P_E$, the robot 1 is stopped at a position $P_S$ diverted from the predetermined teaching route L. When the start button is pressed next, the robot 1 moves at a speed $V_L$ lower than a teaching speed $V_t$ until it reaches a next first teaching point $P_{N+1}$. Passing first teaching point $P_{N+1}$, the robot 1 moves at the teaching speed $V_t$. The robot 1 moves at the low speed VL at a restarting time, so that an operator can check for interference between the robot 1 and the workpiece W. Passing the next first teaching point $P_{N+1}$, the robot 1 moves at the teaching speed $V_t$, so that the reduction of the operation efficiency can be prevented.

6 Claims, 4 Drawing Sheets

ROBOT RESTARTING METHOD

BACKGROUND OF THE INVENTION

1. Technical Field of the Invention

The present invention relates to a restarting method when a robot suddenly stops during movement due to an emergency stop.

2. Description of the Prior Art

A robot stores a plurality of positions as teaching points beforehand. When a start button is pressed, the robot moves operation tools such as a hand or a welding gun attached to the wrist of the robot sequentially along teaching routes passing the teaching points according to the teaching program. The robot carries out interpolation calculations on the basis of the position of each teaching point and moves.

When an emergency stop instruction signal such as emergency stop is input during movement of the robot, a brake is applied to a motor for driving each axis of the robot and the excitation of the motor is turned off. The interpolation process is also stopped and a mechanical unit of the robot is decelerated and stopped. When an operation speed of the robot is fast, the robot cannot immediately stop due to an effect of the moment of inertia and others, and the robot stop position is diverted from the teaching route. For example, when the robot suddenly stops at an operation speed of 2000 mm/s, the movement distance to the stop position after the stop instruction signal is input, is about 100 mm, and therefore the stop position is diverted from the teaching route.

Generally, the robot teaching route is taught so as to prevent the operation tools and arm of the robot from interferring with other devices. Therefore, as described before, when the stop position is shifted from the teaching route when the robot stops suddenly and the robots moves to the next teaching point from this shifted position, there is a possibility that the robot interferes with the other devices.

To solve such a problem, for example, in Japanese Patent Laid-Open 5-100732, "Robot Numerical Controller", a method that when a robot stops in case of emergency, it returns to a position in which the robot has started to stop at a low speed and then moves to the final point at low speed, is disclosed. Therefore, even when the stop position is diverted from a predetermined route, an operator can prevent interference of the robot with other devices by moving it at a low speed and when there is a possibility of interference of the robot with other devices, he can stop the robot immediately and avoid its interference.

However, a problem arises that when the robot moves to the final point at low speed after restarting, the operation efficiency would drastically reduced.

SUMMARY OF THE INVENTION

The present invention was developed in consideration of such a problem and is intended to provide a robot restarting method for preventing interference of a robot with other devices and keeping a high operation efficiency.

The present invention is a robot restarting method in which when a robot moving at a predetermined teaching speed along a teaching route passing a plurality of preset teaching points stops at a stop position during movement and restarts thereafter, comprising a step of restarting the robot and a low speed moving step of moving the robot at a lower speed than the teaching speed until it reaches the next first reaching point of the stop position.

The present invention is the robot restarting method further comprising a speed return step of accelerating the robot and returning the robot speed to the teaching speed.

According to the present invention, the robot moves to the next first teaching point after restarting, so that an operator can confirm sufficiently as to whether the robot interferes with other devices and the operation is safe. When the robot reaches the first teaching point, it moves along the teaching route thereafter. Since the teaching route is a route which is taught so as to prevent interference of the robot, the robot can move at the ordinary teaching speed thereafter. Due to this method, the operation efficiency can be improved compared with the conventional method for moving a robot to the final point at a low speed.

The present invention is the robot restarting method further comprising a medium speed moving step of moving the robot at a medium speed which is lower than the teaching speed and higher than the low speed until the robot reaches the next second teaching point from the first teaching point between the low speed moving step and the speed return step.

According to the present invention, the robot moves to the next first teaching point at the low speed and moves to the next second reaching point at the medium speed. The robot increases its speed in two stages so that the speed reaches the teaching speed like this. Therefore it can be prevented from suddenly increasing its speed up to the teaching speed.

The present invention is the robot restarting method in which the robot can change its speed by a restarting button, and the robot is moved by changing its speed by the restarting button in the low speed moving step.

The present invention is the robot restarting method for moving a robot by changing its speed to a fixed acceleration or a fixed speed by the restarting button in the low speed moving step.

According to the present invention, the robot can move by changing its speed to a fixed acceleration or a fixed speed by pressing the restarting button. Therefore, an operator can optionally switch the moving speed depending on the stop state.

The present invention is the robot restarting method for moving the robot at a fixed acceleration in the low speed moving step.

The present invention is the robot restarting method for moving the robot continuously at the same acceleration as that in the low speed moving step until it reaches the teaching speed after the low speed moving step.

According to the present invention, the moving speed can be increased at the fixed acceleration until it can reach the teaching speed, so that at first the robot can move at the low speed to ensure the safety, gradually increase the speed, and then reach to the teaching speed quickly.

The present invention is the robot restarting method for restarting the robot at the stop position.

According to the present invention, the robot restarts so as to directly move toward the next first teaching point from the stop position, so that it can securely restart quickly.

The present invention is the robot restarting method for returning the robot to the return position of the teaching route once from the stop position and then restarting it from the return position.

According to the present invention, the robot returns to the teaching route once and then performs the restarting operation, so that it can securely prevent interference with other devices.

The present invention is the robot restarting method for setting the low speed moving step so as to have a predetermined time.

DESCRIPTION OF THE PREFERRED EMBODIMENTS

Figure 1:
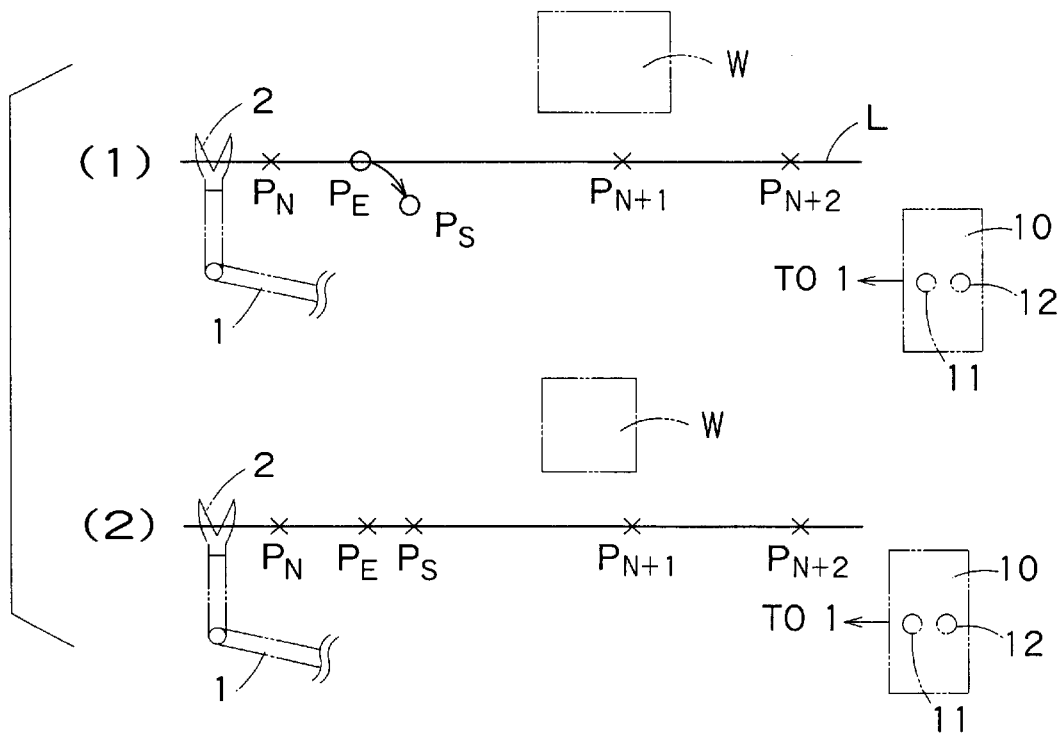
FIG. 1 is a drawing showing an actual position (1) at emergency stop time and an explanatory position (2) for explaining subsequent embodiments.

Next, the robot restarting method of the present invention will be explained hereunder. As shown in FIG. 1, a robot 1 of this embodiment is a 6-axis multi-joint robot having a hand 2 or a spot welding gun on its wrist.

The robot 1 is taught a plurality of teaching points, a moving order, and a moving speed as a program beforehand. The robot 1 sequentially moves along the respective aching points $P_1$, $P_2$, - - - according to the teaching program when a start button (restarting button) 11 on a control panel 10 is pressed. As a teaching route L of the robot 1 passing the respective reaching points $P_1$, $P_2$, - - - , a route free of interference between the robot 1 and a workpiece W and other devices is selected beforehand. When an emergency stop button 12 is pressed during such movement of the robot 1, the robot 1 stops its movement. When the start button 11 is pressed again here, the robot is activated again and starts moving from the emergency stopped position $P_S$ to the next first teaching point $P_{N+1}$. When the robot 1 reaches the next second teaching point $P_{N+2}$, it sequentially moves along the remaining teaching points $P_{N+3}$, - - - according to the teaching program thereafter.

Next, the operation of the robot 1 when restarting will be explained. When stopping in case of emergency, the robot 1 does not stop immediately and as mentioned above, it moves a little and then stops. Although the teaching route L is selected so as to be free of interference between the robot 1 and the workpiece W, when the robot stops in case of emergency, there is a possibility that it may stop at a position diverted from the teaching route L. In this case, when the robot 1 is restarted as usual, there is a possibility that it may interfere with the workpice W or other devices. Therefore, according to the present invention, when restarting, the robot 1 moves at a lower speed than the teaching speed. By doing this, an operator can easily prevent interference between the robot 1 and the workpieces W. When the robot 1 is about to collide with the workpiece W, he can stop the robot 1 immediately before the collision.

The moving speed of the restarting method of the present invention will be explained hereunder by further referring to the drawings. FIG. 1 is a drawing showing a state that when the robot 1 moves along the teaching route L passing a plurality of teaching points $P_1$, $P_2$, - - - and passes the teaching point $P_N$ and then the emergency stop button 12 is pressed at the position $P_E$, the robot 1 completely stops at the position $P_S$. As mentioned above, at emergency stop time of the robot 1, it may be diverted from the teaching route L and the moving locus of the robot 1 at that time is as shown in FIG. 1(1). However, for convenience, the drawing for the subsequent explanation shows that the robot 1 stops on the teaching route L in FIG. 1(2).

Figure 2:
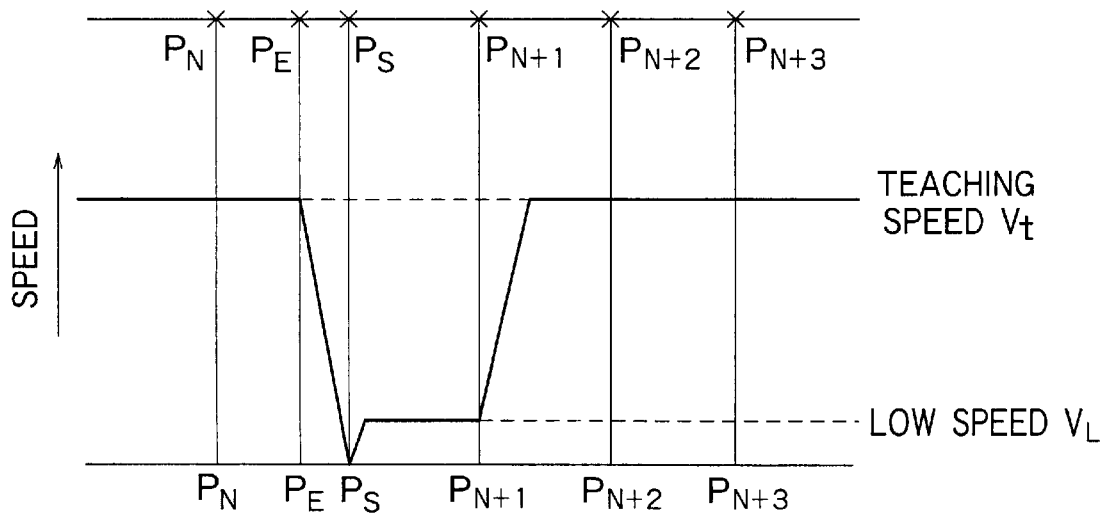
FIG. 2 is a drawing for explaining an embodiment of the robot restarting method of the present invention.

FIG. 2 is a drawing showing the restarting method of an embodiment of the present invention, and the transverse axis indicates a position, and the ordinate axis indicates a moving speed.

The robot 1 passes the teaching point $P_N$ at the teaching speed $V_t$ according to the teaching program, and the emergency stop button 12 is pressed at the position $P_E$ during moving to the next first teaching point $P_{N+1}$, and the robot 1 stops at the position $P_S$. When the start button 11 is pressed here, the robot 1 restarts. Then, the robot 1 moves to the next first teaching point (the welding point) point $P_{N+1}$, at the low speed $V_L$ lower than the teaching speed $V_t$ (the low speed moving step). Thereafter, the speed of the robot 1 is accelerated and returned to the teaching speed $V_t$ (the speed return step) and then the robot 1 moves at the teaching speed $V_t$ according to the teaching program.

Therefore, even if the stop position $P_S$ is diverted from the teaching route L and there is a possibility that the robot 1 may interfere with another workpiece W, when moving from the stop position $P_S$ to the next teaching point (the welding position) $P_{N+1}$, the robot 1 moves at the low speed $V_L$ lower than the ordinary teaching speed $V_t$. Therefore, when an operator judges that the robot 1 is about to interfere with another workpiece W, he can press the emergency stop button 12 and securely stop the robot 1 before the robot 1 actually interferes with the workpiece W. When the interference of the robot 1 is avoided, he presses the start button 11 again. When the robot 1 reaches the first teaching point (the welding point) $P_{N+1}$ in this way, the robot 1 moves at the teaching speed $V_t$ thereafter, so that the operation efficiency can be prevented from reduction.

Figure 3:
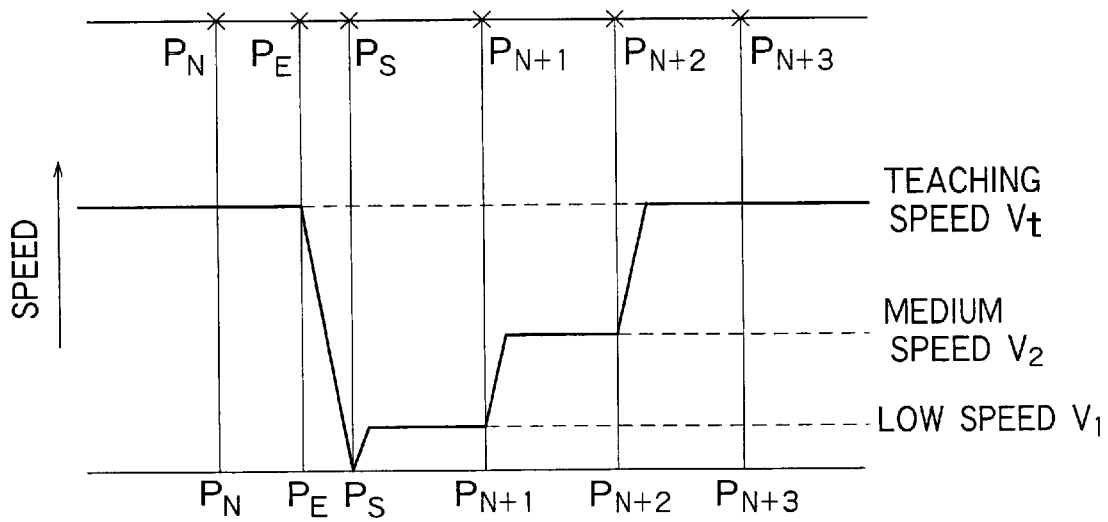
FIG. 3 is a drawing for explaining another embodiment of the robot restarting method of the present invention.

FIG. 3 is a drawing for explaining another embodiment of the robot restarting method of the present invention. According to this embodiment, when the start button 11 is pressed at the position $P_S$, the robot 1 restarts, then moves at a low speed V1 lower than the teaching speed $V_t$ until it reaches the next teaching point $P_{N+1}$ (the low speed moving step), and moves at a medium speed V2 which is higher than the low speed V1 and lower than the teaching speed $V_t$ from the next first teaching point $P_{N+1}$ to the next second teaching point $P_{N+2}$ (the medium speed moving step).

Therefore, even if there is a large difference between the low speed V1 and the teaching speed $V_t$, the moving speed does not quickly increase up to the teaching speed $V_t$ from the low speed V1. The moving speed of the robot 1 increases from the low speed V1 to the medium speed V2 once, and then increases up to the teaching speed $V_t$, so that the robot 1 is prevented from quickly increasing the speed.

Figure 4:
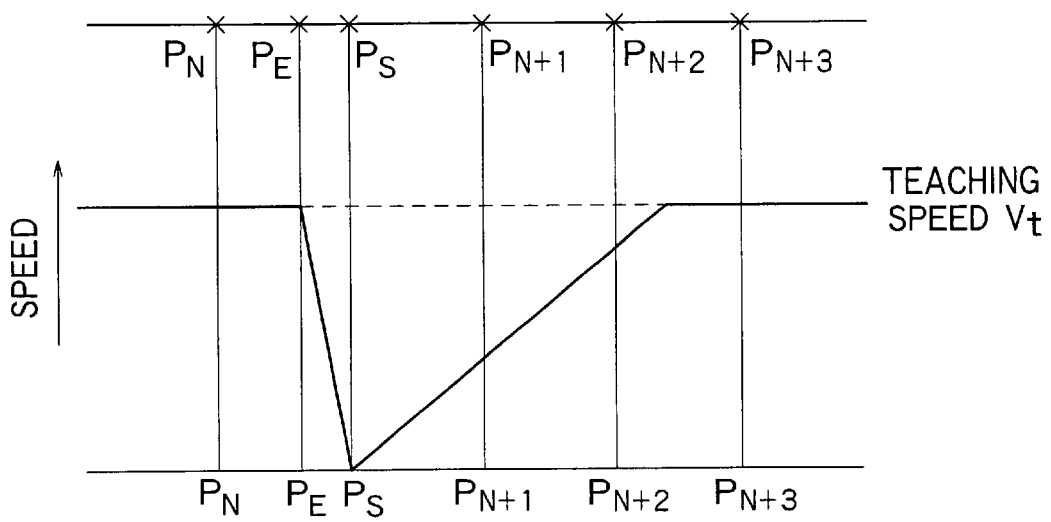
FIG. 4 is a drawing for explaining still another embodiment of the robot restarting method of the present invention.

FIG. 4 is a drawing for explaining still another embodiment of the robot restarting method of the present invention. According to this embodiment, when the start button 11 is pressed after the robot 1 stops at the position $P_S$, the robot 1 restarts and then accelerates the speed at a predetermined acceleration until it reaches the teaching speed $V_t$. Namely, the moving speed of the robot 1 is very low immediately after the start button is pressed, and then changes continuously and gradually increases.

Interference of the robot 1 with the workpiece W should be examined carefully immediately after restarting, and a low speed of the robot 1 is desirable immediately after restarting. When the robot 1 moves to a certain extent, it can be easily judged whether the robot 1 may interferes with another workpiece W. Therefore it is preferable to increase the moving speed from the viewpoint of the operation efficiency. According to this embodiment, as mentioned above, when the start button 11 is pressed, the speed of the robot 1 increases at a fixed accelerations, so that it is possible to make the speed low immediately after restarting. Then the speed of the robot 1 increases gradually to improve the operation efficiency. As shown in FIG. 4, the speed before the robot 1 reaches the teaching speed $V_t$, increases at a fixed acceleration $\alpha$ regardless of whether the robot 1 reaches the next first teaching point $P_{N+1}$ or the second teaching point $P_{N+2}$. The speed increases at a fixed acceleration $\alpha$ extending over the first teaching point $P_{N+1}$ and the second teaching point $P_{N+2}$.

Namely, during the whole steps consisting of the low speed moving step from the position $P_S$, to the first teaching point $P_{N+1}$, the medium speed moving step from the first teaching point $P_{N+1}$ to the second teaching point $P_{N+2}$, and the subsequent speed return step, the robot 1 increases the speed at a fixed acceleration $\alpha$.

Figure 5:
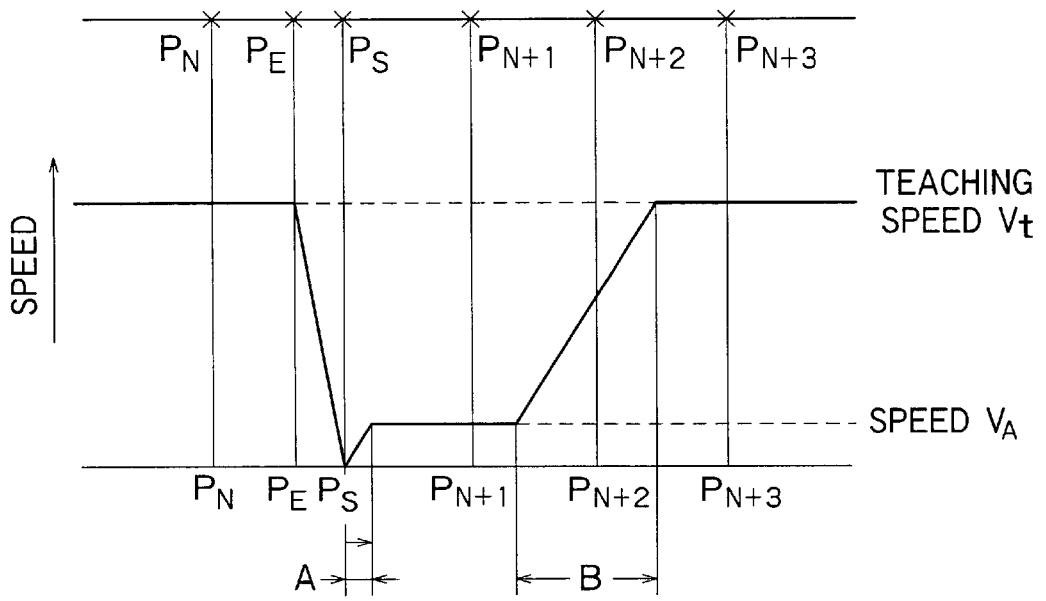
FIG. 5 is a drawing for explaining a further embodiment of the robot restarting method of the present invention.

FIG. 5 is a drawing for explaining a further embodiment of the robot restarting method of the present invention. According to this embodiment, during pressing the start button (restarting button), the moving speed can be adjusted. Namely, when the start button 11 is pressed (turn-on state), the speed of the robot increases at a fixed acceleration$\alpha$ and when the start button 11 is released (turn-off state), the robot 1 keeps the speed constant. When the speed of the robot 1 is accelerated at the acceleration $\alpha$ and reaches the teaching speed $V_t$ (the speed return step), the robot 1 is automatically kept at the teaching speed $V_t$ and moves.

As shown in FIG. 5, when the start button 11 is pressed and soon released after the robot 1 is stopped at the position $P_S$, the start button 11 is pressed only for a very short time A. In this case, the robot 1 is restarted first, accelerated up to the very low speed $V_A$ immediately after restarting, and then moves at a low speed $V_A$. Thereafter, the robot 1 moves by keeping the speed $V_A$ regardless of whether the robot 1 reaches the next first teaching point $P_{N+1}$ or not, that is, passing the first teaching point $P_{N+1}$.

When the robot 1 moves at the low speed $V_A$ and it is confirmed no interference of the robot 1 with another workpiece W, the robot 1 does not need to move at the low speed $V_A$. In this case, an operator presses the start button 11 again. During pressing of the start button 11, the speed of the robot 1 increases at the acceleration$\alpha$ and increases fixedly regardless of whether the robot1 reaches the next teaching point $P_{N+2}$ or not. When the speed of the robot 1 reaches the teaching speed $V_t$, the robot 1 is kept at the teaching speed $V_t$. In this case, the interval from immediately after restarting to the first reaching point $P_{N+1}$ constitutes the low speed moving step, and the interval from the first reaching point $P_{N+1}$ to the second teaching point $P_{N+2}$ constitutes the medium speed moving step, and the interval until the speed reaches the teaching speed $V_t$ thereafter constitutes the speed return step.

The moving speed of the robot 1 can be adjusted depending on the time required for pressing the start button 11 in this way, so that an operator can adjust the speed depending on operating conditions and increase the operation efficiency.

Figure 6:
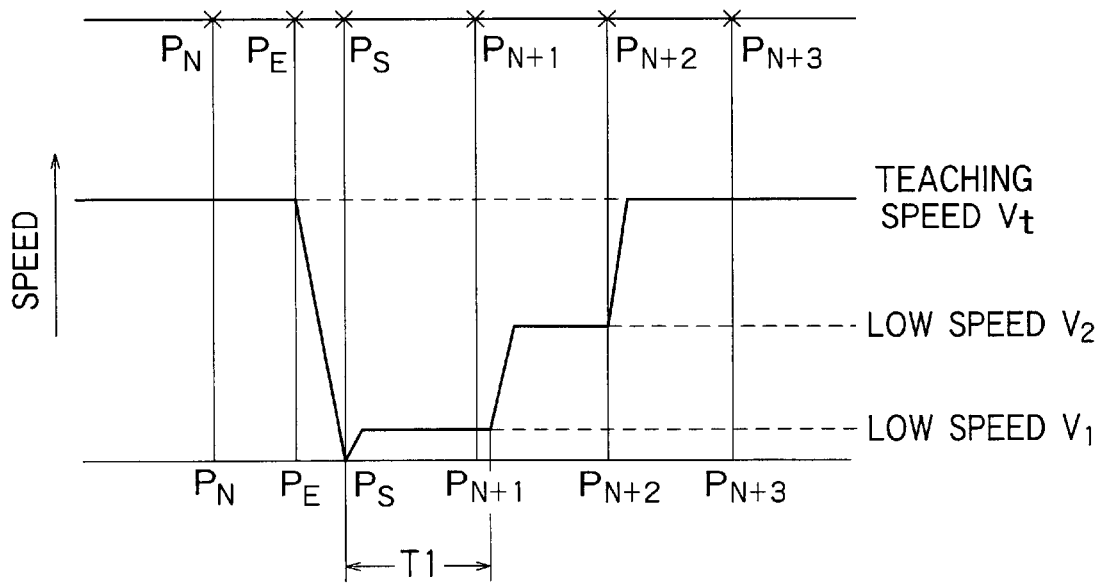
FIG. 6 is a drawing for explaining a still further embodiment of the robot restarting method of the present invention.

FIG. 6 is a drawing for explaining a still further embodiment of the robot restarting method of the present invention.

According to this embodiment, when the start button 11 is pressed in the emergency stop state, the robot 1 is restarted, accelerated up to the low speed V1, and moves at the low speed V1 (the low speed moving step). When the time for pressing the start button 11 becomes longer than the predetermined time T1 and the robot 1 passes the first teaching point $P_{N+1}$, the robot 1 is accelerated to the medium speed V2 and thereafter moves at the medium speed V2 (the medium speed moving step). When the robot 1 reaches the next second teaching point $P_{N+2}$ after the robot 1 switches the speed to the medium speed V2, the robot 1 is accelerated to the teaching speed $V_t$, (the speed return step) and moves at the teaching speed $V_t$.

In the example shown in FIG. 6, the start button 11 is pressed at the stop position $P_S$, and the speed of the robot 1 is kept at the moving speed V1, and the start button 11 is pressed continuously in this state. When the time for pressing the start button 11 reaches the predetermined time T1, the speed is switched to the next medium speed V2. Even if the robot 1 reaches the next teaching point $P_{N+1}$ during pressing of the start button 11, the robot 1 keeps the low speed V1. Next, when the robot 1 moves at the medium speed V2 higher than the low speed V1 and reaches the next teaching point $P_{N+1}$, the speed automatically increases up to the teaching speed $V_t$.

Although there is a possibility of interference between the robot 1 and the workpiece W after restarting in the conventional method, according to this embodiment, at least during the predetermined time T1 the robot 1 moves at the low speed V1 immediately after restarting, so that such interference can be prevented.

Figure 7:
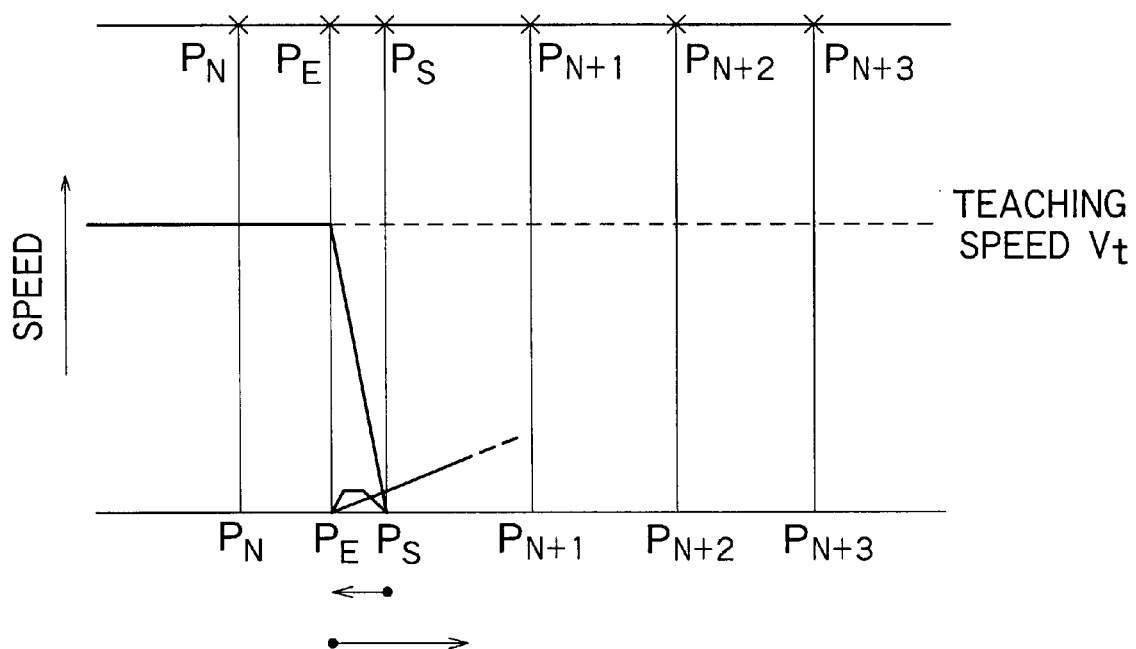
FIG. 7 is a drawing for explaining yet a further embodiment of the robot restarting method of the present invention.

FIG. 7 is a drawing for explaining yet a further embodiment of the robot restarting method of the present invention. According to the aforementioned respective embodiments, when the start button is pressed after emergency stop, the robot 1 restarts. In this case, the robot 1 starts moving toward the next teaching point from the emergency stop position, that is, the position $P_S$ diverted from the teaching route L shown in FIG. 1(1).

On the other hand, this embodiment stores a robot instruction position (return position) $P_E$ on the teaching route L at which the emergency stop button 12 is pressed. When the start button 11 is pressed at the stop position, $P_S$, the robot 1 returns first to the position (the return position) $P_E$ at a predetermined low speed, and stops there once. Namely, even if the robot 1 from the teaching route L when the robot 1 is stopped by pressing the emergency stop button 12, the robot 1 moves first toward the position $P_E$ at which the emergency stop button 12 is pressed, so that no interference will be caused between the robot 1 and the workpiece W. When the start button 11 is pressed again after the robot 1 stops at the position $P_E$ once, the robot 1 starts moving at a low speed by any of the restarting methods explained in FIGS. 2 to 6. Since the start button 11 is pressed again like this, the interference between the robot 1 and the workpiece W can be prevented.

As mentioned above, according to the present invention, the robot 1 moves at a low speed at the restarting time period, so that no interference between the robot and the workpiece can be confirmed. The robot 1 reaches the next first teaching point. and then the robot increases the speed up to the teaching speed. In this manner, the low speed is not continued up to the final point like the conventional method, so that the efficiency can be enhanced.

In the case where the speed is increased up to the teaching speed in two stages consisting of a low speed and a medium speed, even if the low speed is too low, the moving speed is prevented from quickly increasing.

In the case where after the restarting time period for which interference is easily caused, the speed is continuously increased at a certain acceleration instead of a speed stepwise, the speed can be increased gradually and the operability can be improved.

Since the speed can be adjusted by button operation, the operability can be improved more.

Such speed control at the restarting time period may be performed when the robot moves from the stop position to the next teaching point. The robot can be controlled so that the robot 1 first return from the stop position to the teaching route once and then move at a low speed.

What is claimed is:

1. A robot restarting method for restarting a robot after the robot, moving at a predetermined teaching speed along a teaching route passing a plurality of preset teaching points, is stopped at a stop position during movement, comprising:

a step of restarting said robot;

a low speed moving step of moving said robot at a lower speed than said teaching speed until said robot reaches a next first reaching point of stop position; and a speed return step of accelerating said robot and returning said robot speed to said teaching speed.

2. A robot restarting method according to claim 1, wherein said method further comprises a medium speed moving step of moving said robot at a medium speed which is lower than the teaching speed and higher than the low speed until said robot reaches a next second teaching point from said first teaching point between said low speed moving step and said speed return step.

3. A robot restarting method for restarting a robot after the robot, moving at a predetermined teaching speed along a teaching route passing a plurality of preset teaching points, is stopped at a stop position during movement, comprising:

a step of restarting said robot; and a low speed moving step of moving said robot at a lower speed than said teaching speed until said robot reaches a next first reaching point of stop position, wherein said robot can change said speed by a restarting button, and said robot is moved by changing a speed of said robot by the restarting button in said low speed moving step.

4. A robot restarting method according to claim 3, wherein said robot is moved by changing said robot speed to a fixed acceleration or a fixed speed by said restarting button in said low speed moving step.

5. A robot restarting method for restarting a robot after the robot, moving at a predetermined teaching speed along a teaching route passing a plurality of preset teaching points, is stopped at a stop position during movement, comprising:

a step of restarting said robot;

a low speed moving step of moving said robot at a lower speed than said teaching speed until said robot reaches a next first reaching point of stop position, wherein said robot is moved at the fixed acceleration in said low speed moving step, and said robot is moved continuously at the same acceleration as said acceleration in said low speed moving step until said robot reaches said teaching speed after said low speed moving step.

6. A robot restarting method for restarting a robot after the robot, moving at a predetermined teaching speed along a teaching route passing a plurality of preset teaching points, is stopped at a stop position during movement, comprising:

a step of restarting said robot; and a low speed moving step of moving said robot at a lower speed than said teaching speed until said robot reaches a next first reaching point of stop position, wherein said robot is returned to a return position of said teaching route once from said stop position and then restarted from said return position.

* * * * *